US012698354B2

(12) United States Patent
Shin et al.

(10) Patent No.: US 12,698,354 B2
(45) Date of Patent: Aug. 4, 2026

(54) METHOD FOR PREPARING POLYMER

(71) Applicant: LG CHEM, LTD., Seoul (KR)

(72) Inventors: Dae Young Shin, Daejeon (KR); Jeong A Hwang, Daejeon (KR); Eun Jung Joo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 763 days.

(21) Appl. No.: 17/632,232

(22) PCT Filed: Jul. 1, 2021

(86) PCT No.: PCT/KR2021/008315
§ 371 (c)(1),
(2) Date: Feb. 1, 2022

(87) PCT Pub. No.: WO2022/019515
PCT Pub. Date: Jan. 27, 2022

(65) Prior Publication Data
US 2022/0282011 A1 Sep. 8, 2022

(30) Foreign Application Priority Data
Jul. 22, 2020 (KR) ........................ 10-2020-0091134

(51) Int. Cl.

| | |
|---|---|
| C08F 6/00 | (2006.01) |
| B01D 3/14 | (2006.01) |
| B01D 5/00 | (2006.01) |
| B01D 19/00 | (2006.01) |
| B01D 53/00 | (2006.01) |
| C08F 6/10 | (2006.01) |
| C08F 212/10 | (2006.01) |
| C08F 220/44 | (2006.01) |

(52) U.S. Cl.
CPC ............ *C08F 212/10* (2013.01); *B01D 3/143* (2013.01); *B01D 5/006* (2013.01); *B01D 19/00* (2013.01); *B01D 53/002* (2013.01); *C08F 220/44* (2013.01)

(58) Field of Classification Search
CPC .............. C08F 6/00; C08F 6/10; B01D 19/00
See application file for complete search history.

(56) References Cited

U.S. PATENT DOCUMENTS

| | | | |
|---|---|---|---|
| 3,513,145 A | 5/1970 | Crawford | |
| 4,268,652 A * | 5/1981 | Kent, Jr. .............. | C08F 212/10 |
| | | | 526/342 |
| 4,699,976 A * | 10/1987 | Matsubara .............. | B01D 3/06 |
| | | | 525/240 |
| 2007/0142576 A1 | 6/2007 | Tait et al. | |
| 2009/0124779 A1 | 5/2009 | Cousin et al. | |
| 2013/0291720 A1 | 11/2013 | Blood et al. | |

FOREIGN PATENT DOCUMENTS

| | | | | |
|---|---|---|---|---|
| CN | 107456775 A | 12/2017 | | |
| CN | 111359377 A | 7/2020 | | |
| JP | 2002-363115 A | 12/2002 | | |
| KR | 10-1995-0013550 A | 6/1995 | | |
| KR | 100210529 B1 | 7/1999 | | |
| KR | 10-2004-0015127 A | 2/2004 | | |
| KR | 10-2011-0110182 A | 10/2011 | | |
| KR | 10-2012-0136196 A | 12/2012 | | |
| KR | 10-2013-0009099 A | 1/2013 | | |
| KR | 10-2013-0090895 A | 8/2013 | | |
| KR | 10-2015-0039815 A | 4/2015 | | |
| KR | 10-2016-0048011 A | 5/2016 | | |
| KR | 10-2018-0092403 A | 8/2018 | | |
| KR | 10-2020-0075718 A | 6/2020 | | |
| WO | WO2012082674 A1 | 6/2012 | | |
| WO | WO-2020130264 A1 * | 6/2020 | .............. | B01D 3/10 |

OTHER PUBLICATIONS

Machine translation into English of WO-2020130264-A1; Hwang et al (Year: 2020).*
Supplementary European Search Report for related Application No. EP 21840764.1, mailed Oct. 11, 2022.

* cited by examiner

*Primary Examiner* — Karuna P Reddy

(74) *Attorney, Agent, or Firm* — ROTHWELL, FIGG, ERNST & MANBECK, P.C.

(57) ABSTRACT

Provided is a method of preparing a polymer including: supplying a monomer stream and a solvent stream to a reactor and performing a polymerization reaction to prepare reaction product; supplying a reactor discharge stream to a separation device, separating a gaseous stream including an inert gas in the separation device, and supplying a liquid stream including the reaction product from which the inert gas is removed to a volatilization device; separating a polymer from a lower discharge stream from the volatilization device and supplying an upper discharge stream including an unreacted monomer, a solvent, and an inert gas to a condensation unit; and condensing and separating the unreacted monomer and the solvent in the condensation unit and supplying a gaseous stream to a vacuum unit.

5 Claims, 1 Drawing Sheet

【FIG. 1】
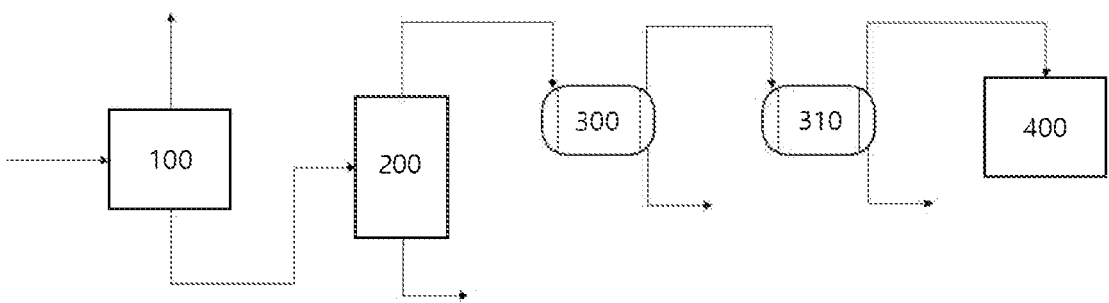
【FIG. 2】
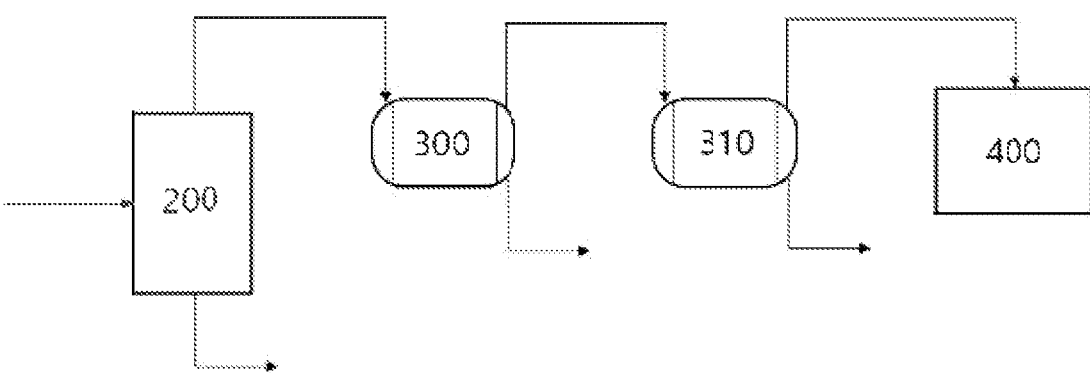

METHOD FOR PREPARING POLYMER

CROSS-REFERENCE TO RELATED APPLICATIONS

The present application is a National Phase of International Application No. PCT/KR2021/008315, filed Jul. 1, 2021, which claims the benefit of priority to Korean Patent Application No. 10-2020-0091134, filed on Jul. 22, 2020, the entire contents of which are incorporated herein as a part of the specification.

TECHNICAL FIELD

The present invention relates to a method of preparing a polymer, and more particularly, to a method of separating a polymer from a reaction product including the polymer and VOC components, for example, an unreacted monomer, a solvent, and the like and efficiently recovering the VOC components.

BACKGROUND ART

Recovery of volatile components such as volatile organic compounds (VOC) from a flowable substance is an essential step in various industrial processes including preparation of various polymers. For example, when a polymer is prepared using a monomer, the polymer is separated from a reaction product including the polymer and VOC components, for example, an unreacted monomers and a solvent, and the VOC components should be recovered.

Usually, since it takes a long time for VOC components confined in the polymer to diffuse from the polymer to the surface and move into a gaseous phase, recovery of the VOC components is performed under high temperature and high vacuum conditions. However, since a very low condensation temperature is required to condense the VOC components under a high vacuum condition, an overload on a freezer is caused in the process of condensing vaporized VOC components to be recovered in a reactor.

DISCLOSURE

Technical Problem

In order to solve the problems mentioned in the Background Art, an object of the present invention is to provide a method allowing VOC components to be effectively recovered from flowable substances such as a reaction product and reducing energy consumption by increasing a condensation efficiency in the process of condensing and recycling the recovered VOC components.

Technical Solution

In one general aspect, a method of preparing a polymer includes: supplying a monomer stream and a solvent stream to a reactor and performing a polymerization reaction to prepare reaction product; supplying a reactor discharge stream to a separation device, separating a gaseous stream including an inert gas in the separation device, and supplying a liquid stream including the reaction product from which the inert gas is removed to a volatilization device; separating a polymer from a lower discharge stream from the volatilization device and supplying an upper discharge stream including an unreacted monomer, a solvent, and an inert gas to a condensation unit; and condensing and separating the unreacted monomer and the solvent in the condensation unit and supplying a gaseous stream to a vacuum unit.

Advantageous Effects

According to the method of preparing a polymer of the present invention, an inert gas is removed from a flowable substance such as a reaction product, VOC components may be effectively recovered from the reaction product from which the inert gas is removed, and the condensation efficiency is increased in a process of condensing and recycling the VOC components, whereby a recovered amount of VOC may be increased to reduce raw material costs and wastewater treatment costs.

DESCRIPTION OF DRAWINGS

FIG. 1 is a process flow diagram according to the method of preparing a polymer in the exemplary embodiment of the present invention.

FIG. 2 is a process flow diagram according to the method of preparing a polymer in the Comparative Example.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, the term "stream" may refer to a fluid flow in a process, or may refer to a fluid itself flowing in a pipe. Specifically, the "stream" may refer to both a fluid itself flowing in a pipe connecting each apparatus and a fluid flow. In addition, the fluid may refer to a gas, a liquid, and the like.

Hereinafter, the present invention will be described in more detail for better understanding of the present invention, with reference to FIG. 1.

According to the present invention, a method of preparing a polymer is provided. More specifically, in the preparation of a polymer, a method of increasing a condensation efficiency of VOC components to increase a recovered amount may be provided. The method of preparing a polymer may include: supplying a monomer stream and a solvent stream to a reactor and performing a polymerization reaction to prepare reaction product; supplying a reactor discharge stream to a separation device 100, separating a gaseous stream including an inert gas in the separation device 100, and supplying a liquid stream including the reaction product from which the inert gas is removed to a volatilization device 200; separating a polymer from a lower discharge stream from the volatilization device 200 and supplying an upper discharge stream including an unreacted monomer, a solvent, and an inert gas to a condensation unit; and condensing and separating the unreacted monomer and the solvent in the condensation unit and supplying a gaseous stream to a vacuum unit 400.

The polymer may be produced by supplying a monomer stream and a solvent stream to a reactor and performing a polymerization reaction. Specifically, a reaction product including a polymer and VOC components such as an unreacted monomer and a solvent may be prepared by the polymerization reaction.

The polymer may include an aromatic vinyl-unsaturated nitrile-based copolymer. For example, when the polymer is the aromatic vinyl-unsaturated nitrile-based copolymer, the monomer stream may include an aromatic vinyl-based monomer and an unsaturated nitrile-based monomer.

The aromatic vinyl-based monomer may be, for example, one or more selected from the group consisting of styrene, α-methylstyrene, p-bromostyrene, p-methylstyrene, p-chlorostyrene, and o-bromostyrene, and more specifically styrene.

The addition, the unsaturated nitrile-based monomer may be one or more selected from the group consisting of acrylonitrile, methacrylonitrile, ethacrylonitrile, phenylacrylonitrile, and α-chloroacrylonitrile, and specifically acrylonitrile.

The monomer stream may include the aromatic vinyl-based monomer and the unsaturated nitrile-based monomer at a weight ratio of 65:35 to 78:22. When the monomer stream including the aromatic vinyl-based monomer and the unsaturated nitrile-based monomer within the range is supplied to the reactor and the aromatic vinyl-unsaturated nitrile-based copolymer is prepared, a polymerization conversion rate is increased and the mechanical strength, thermal resistance, and surface properties of the prepared copolymer may be improved. In addition, when the content of the aromatic vinyl-based monomer satisfies the above content range, an appropriate polymerization rate may be maintained and the thermal resistance of the prepared copolymer may be improved.

The solvent may include one or more selected from the group consisting of alcohols; aromatic hydrocarbons such as petroleum ether and ethylbenzene; and halides such as carbon tetrachloride and chloroform; ketone-based compounds such as methylethylketone. The solvent stream may be supplied at 10 parts by weight to 30 parts by weight with respect to a total of 100 parts by weight of the monomer stream. When the solvent stream is supplied within the range, an appropriate viscosity for the polymerization reaction is maintained and the physical properties of the produced polymer are effectively controlled, so that productivity may be improved.

According to an exemplary embodiment of the present invention, the reactor may be further supplied with a polymerization initiator stream. The polymerization initiator may include one or more selected from the group consisting of 2,2-bis(4,4-di-t-butylperoxy cyclohexane)propane, 1,1-bis(t-butylperoxy)-3,3,5-trimethylcyclohexane, 1,1-bis(t-hexylperoxy)-3,3,5-trimethylcyclohexane, 1,1-bis(t-butylperoxy)-2-methylcyclohexane, 1,1-bis(t-hexylperoxy)cyclohexane, 1,1-bis(t-butylperoxy)cyclohexane, and t-hexylperoxyisopropyl monocarbonate, and the polymerization initiator stream may be supplied at 0.01 parts by weight to 0.1 parts by weight with respect to a total of 100 parts by weight of the monomer stream.

The polymerization reaction may be performed at a temperature of 100° C. to 180° C., 100° C. to 150° C., or 115° C. to 135° C. When the temperature of the polymerization reaction is adjusted to the range, production of an oligomer during polymerization may be decreased.

The operation pressure of the reactor may be 1 kgf/cm$^2$g to 4 kgf/cm$^2$g, 1.5 kgf/cm$^2$g to 3.5 kgf/cm$^2$g, or 2 kgf/cm$^2$g to 3.5 kgf/cm$^2$g. An inert gas may be used for controlling the pressure within the range. Here, the inert gas may include one or more selected from the group consisting of nitrogen (N$_2$) and argon (Ar), and as a specific example, the inert gas may be nitrogen (N$_2$).

A part of the inert gas may be dissolved in the reaction product and introduced to a process at a rear end. Therefore, the reactor discharge stream may further include the inert gas together with the polymer, the unreacted monomer, and the solvent. The content of the inert gas included in the reactor discharge stream may be 100 ppm to 1000 ppm, 150 ppm to 700 ppm, or 150 ppm to 550 ppm with respect to the total content of the reaction product. As such, when the reactor discharge stream including the inert gas is supplied to a volatilization device 200 and VOC components are separated, the inert gas is included in the VOC components, and when the VOC components including the inert gas are condensed and separated, a condensation efficiency is decreased.

Therefore, in the present invention, before the reactor discharge stream is introduced to the volatilization device 200, the separation device 100 is used to remove the inert gas included in the reactor discharge stream, thereby solving the problem.

In an exemplary embodiment of the present invention, the reactor discharge stream is supplied to the separation device 100, a gaseous stream including the inert gas is separated in the separation device 100, and a liquid stream including the reaction product from which the inert gas is removed may be supplied to the volatilization device 200.

The separation device 100 selectively removes the inert gas from the liquid polymer, the gaseous unreacted monomer, the solvent, and the inert gas in the reactor discharge stream to remove the inert gas while decreasing a loss of VOC components such as the unreacted monomer and the solvent, thereby increasing a VOC recovery rate and saving an efficiency in the condensation unit and utility costs.

The operation temperature of the separation device 100 may be 100° C. to 200° C., 120° C. to 160° C., or 130° C. to 150° C. In addition, the operation pressure of the separation device 100 may be 1 kgf/cm$^2$g to 4 kgf/cm$^2$g, 1 kgf/cm$^2$g to 3.5 kgf/cm$^2$g, or 1.5 kgf/cm$^2$g to 3.5 kgf/cm$^2$g. Specifically, the separation device 100 may control the operation temperature and the operation pressure within the range for selectively removing the inert gas from the reactor discharge stream, and when the separation device 100 is operated while the conditions are satisfied, the inert gas is removed while a loss of VOC components such as the unreacted monomer and the solvent is decreased, thereby increasing a VOC recovery rate and saving an efficiency in the condensation unit and utility costs.

The content of the inert gas in the gaseous stream separated in the separation device 100 may be 80 wt % or more, 85 wt % to 99 wt %, or 90 wt % to 99 wt %. As such, the inert gas is selectively separated and removed in the separation device 100, thereby increasing a VOC recovery rate and saving an efficiency in the condensation unit and utility costs.

The content of the inert gas in the liquid stream including the reaction product from which the inert gas is removed in the separation device 100 may be 10 ppm to 150 ppm, 30 ppm to 120 ppm, or 50 ppm to 90 ppm. As such, the reactor discharge stream is supplied to the volatilization device 200 in the state in which the inert gas is almost removed therefrom, thereby increasing a VOC recovery rate and increasing the condensation efficiency of the separated VOC components.

The content of the inert gas removed as a gaseous stream in the separation device 100 may be 75% to 99%, 80% to 95%, or 80% to 90%, relative to the content of the inert gas included in the reactor discharge stream supplied to the separation device 100. The reactor discharge stream passes through the separation device 100 and the inert gas is removed within the range therefrom, thereby decreasing the content of the inert gas in the VOC components introduced to the condensation unit to increase the condensation efficiency.

According to an exemplary embodiment of the present invention, the liquid stream including the reaction product from which the inert gas is removed in the separation device 100 may be supplied to the volatilization device 200. In the volatilization device 200, the polymer is separated from the lower discharge stream and the upper discharge stream including the unreacted monomer, the solvent, and the inert gas may be supplied to a condensation unit.

The operation pressure of the volatilization device 200 may be, for example, 5 torr to 70 torr, 20 torr to 60 torr, or 40 torr to 55 torr. By operating the volatilization device 200 in the condition of the pressure range, the polymer and the VOC components including the unreacted monomer, and the solvent may be effectively separated while suppressing a side reaction.

The operation temperature of the volatilization device 200 may be 100° C. to 400° C., 120° C. to 350° C., or 150° C. to 300° C. By operating the volatilization device 200 at the temperature in the above range, the unreacted monomer, the solvent, and the inert gas may be effectively separated from the upper discharge stream from the volatilization device 200, and when the upper discharge stream from the volatilization device 200 is supplied to the condensation unit described later and condensed, a condensation efficiency may be increased and utility costs may be reduced due to the use of a refrigerant at a relatively high temperature.

In the volatilization device 200, the total amount of the polymer is recovered from the lower discharge stream, and the upper discharge stream including the unreacted monomer, the solvent, and the inert gas may be separated.

The upper discharge stream from the volatilization device 200 may include 10 wt % to 95 wt %, 20 wt % to 80 wt %, or 30 wt % to 70 wt % of the unreacted monomer, 5 wt % to 60 wt %, 10 wt % to 50 wt %, or 10 wt % to 40 wt % of the solvent, and 10 ppm to 400 ppm, 100 ppm to 300 ppm, or 200 ppm to 300 ppm of the inert gas.

The upper discharge stream from the volatilization device 200 including the unreacted monomer, the solvent, and the inert gas is supplied to the condensation unit, and VOC components such as the unreacted monomer and the solvent in the upper discharge stream from the volatilization device 200 may be condensed and recovered. In addition, the gaseous stream discharged from the condensation unit may be supplied to a vacuum unit 400.

Conventionally, when the inert gas is introduced to the condensation unit with the VOC components such as the unreacted monomer and the solvent, a condensation efficiency is decreased. Specifically, conventionally the VOC components were recovered using one condenser using cooling water which is advantageous in terms of costs as a refrigerant for recovering the VOC components from the upper discharge stream from the volatilization device, but in this case, when a vacuum degree was very high, there was a limitation in condensing all VOC components.

In addition, in order to solve the problem, a study on a process for improving a VOC recovery rate was performed, in which two condensers are used for recovering VOC components from an upper discharge stream from a volatilization device using a refrigerant which is higher-priced but at a lower temperature than cooling water, for example, brine, and condensation is performed using low-priced cooling water in a first condenser and residual VOC components which have not been condensed in the first condenser are condensed using a brine solvent which is at a lower temperature than cooling water in a second condenser. In this case, in the first condenser, the unreacted monomer and the solvent are condensed a lot to increase the content of the inert gas in the stream supplied to the second condenser installed at the rear end and the condensation efficiency of the second condenser is decreased to increase a used amount of process water used in the vacuum unit at the rear end of the second condenser, thereby increasing wastewater treatment costs. In addition, since the boiling point of the inert gas is low, there is a limitation in lowering a refrigerant temperature and increasing the recovery rate of the unreacted monomer and the solvent due to the exchange of the condenser or the like.

In addition, in order to solve the problem, a method of providing a separate device such as a membrane between the first condenser and the second condenser to decrease the content of the inert gas in the stream supplied to the second condenser was considered, but this method requires a further vacuum device for increasing a pressure difference between the inside and the outside of the membrane and needs a membrane having a large area.

In this regard, in the present invention, as described above, the inert gas is selectively removed from the reactor discharge stream using the separation device 100, and the reactor discharge stream from which the inert gas is removed is supplied to the volatilization device 200, thereby preventing an efficiency decrease of the second condenser 310. In addition, the recovery amounts of the unreacted monomer and the solvent are increased to reduce raw material costs, and the used amount of the process water in the vacuum unit 400 at the rear end of the second condenser 310 is decreased to reduce wastewater treatment costs.

According to an exemplary embodiment of the present invention, the upper discharge stream from the volatilization device 200 is supplied to the condensation unit, and the VOC components such as the unreacted monomer and the solvent included in the upper discharge stream from the volatilization device 200 are condensed and separated to be reused in the condensation unit, thereby reducing raw material costs.

The condensation unit may be composed of two or more condensers. Specifically, the unreacted monomer and the solvent are condensed and separated from the upper discharge stream from the volatilization device 200 using two or more condensers, thereby reducing raw material costs and reducing wastewater treatment costs.

For example, the condensation unit may be provided with two condensers including a first condenser 300 and a second condenser 310. Specifically, the upper discharge stream from the volatilization device 200 may be supplied to the first condenser 300, the unreacted monomer and the solvent may be condensed and separated in the first condenser 300, the gaseous stream may be supplied to the second condenser 310, the unreacted monomer and the solvent may be condensed and separated in the second condenser 310, and the gaseous stream may be supplied to the vacuum unit 400.

The first condenser 300 is supplied with the upper discharge stream from the volatilization device 200 and condenses the stream using a refrigerant, the condensed unreacted monomer and solvent are separated and recovered, and the gaseous stream which has not been condensed in the first condenser 300 may be supplied to the second condenser 310. Here, the contents of the unreacted monomer and the solvent condensed in the first condenser 300 may be 50 wt % to 90 wt %, 60 wt % to 90 wt %, or 70 wt % to 80 wt % with respect to the total content of the unreacted monomer and the solvent included in the upper discharge stream from the volatilization device 200.

The content of the inert gas in the gaseous stream discharged from the first condenser 300 may be 100 ppm to 800 ppm, 300 ppm to 700 ppm, or 450 ppm to 600 ppm. The numerical value represents the content of the inert gas in the remaining components in which the unreacted monomer and the solvent are partially condensed in the first condenser 300, and is higher than the content of the inert gas in the upper discharge stream from the volatilization device 200 before condensation in the first condenser 300, but is much decreased as compared with the numerical value shown in the absence of the separation device 100. As such, by decreasing the content of the inert gas in the stream supplied to the volatilization device 200 using the separation device 100, the content of the inert gas in the gaseous stream discharged from the first condenser 300 may be lowered to the above range. In addition, when the gaseous stream discharged from the first condenser 300 is supplied to the second condenser 310, a condensation efficiency decrease of the second condenser 310 may be prevented.

A gaseous stream which has not been condensed in the first condenser 300 may be supplied to the second condenser 310 and further condensed. Specifically, the second condenser 310 is supplied with an uncondensed gaseous stream from the first condenser 300, and condenses and separates the remaining unreacted monomer and the solvent, and the remaining stream may be supplied to a vacuum unit 400.

The contents of the unreacted monomer and the solvent condensed in the second condenser 310 may be 70 wt % to 90 wt %, 75 wt % to 90 wt %, or 75 wt % to 85 wt % with respect to the total content of the unreacted monomer and the solvent included in the gaseous stream discharged from the first condenser 300.

In the first condenser 300 and the second condenser 310, one or more selected from the group consisting of cooling water, brine, and a heating medium oil may be included as a refrigerant. As a specific example, the refrigerant used in the first condenser 300 may be cooling water, and the refrigerant used in the second condenser 310 may be brine. Here, the temperature of the refrigerant supplied to the first condenser 300 may be 15° C. to 40° C., 20° C. to 35° C., or 25° C. to 30° C., and the temperature of the refrigerant supplied to the second condenser 310 may be –5° C. to 10° C., 0° C. to 7° C., or 2° C. to 6° C.

The contents of the unreacted monomer and the solvent condensed in the first condenser 300 and the second condenser 310 may be 90 wt % to 99.9 wt %, 95 wt % to 99 wt %, or 96 wt % to 98.5 wt % with respect to the total content of the unreacted monomer and the solvent included in the upper discharge stream from the volatilization device 200. As such, it may be confirmed that the recovery amounts of the unreacted monomer and the solvent included in the upper discharge stream from the volatilization device 200 are very high, by preventing a condensation efficiency decrease of the second condenser 310.

According to an exemplary embodiment of the present invention, the gaseous stream which has not been condensed in the condensation unit may be supplied to a vacuum unit 400. As a specific example, the gaseous stream which has not been condensed in the second condenser 310 may be supplied to the vacuum unit 400, and the gaseous stream which has not been condensed in the second condenser 310 may be introduced to a water cooling type pump of the vacuum unit 400 and pass through a wastewater treatment system.

As described above, in the present invention, the reactor discharge stream is passes through the separation device 100 before being supplied to the volatilization device 200 to lower the content of the inert gas, thereby preventing the condensation efficiency decrease of each condensation unit, and thus, increasing the amounts of the unreacted monomer and the solvent recovered in the condensation unit. Accordingly, the amount of process water used in the vacuum unit 400 is decreased to decrease a wastewater generation amount.

Hereinabove, the method of preparing a polymer according to the present invention has been described and illustrated in the drawings, but the description and the illustration in the drawings are the description and the illustration of only core constitutions for understanding of the present invention, and in addition to the process and apparatus described above and illustrated in the drawings, the process and the apparatus which are not described and illustrated separately may be appropriately applied and used for carrying out the method of preparing a polymer according to the present invention.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

As shown in FIG. 1, a polymer, an unreacted monomer, and a solvent were separated from a reaction product and recovered.

Specifically, a reaction product including a styrene-acrylonitrile (SAN) copolymer as a polymer, an unreacted monomer, a solvent, and nitrogen was supplied to a separation device 100 to separate and remove nitrogen, and a liquid stream including the reaction product from which nitrogen was removed was supplied to a volatilization device 200. Here, the operation temperature of the separation device 100 was 140° C. and the operation pressure was controlled to 2 kgf/cm²g.

In the volatilization device 200, the polymer was separated from a lower portion and the unreacted monomer, the solvent, and the inert gas were separated from an upper discharge stream.

The upper discharge stream from the volatilization device 200 was supplied to a first condenser 300, the first condenser 300 condensed a first stream of the volatilization device 200 using a cooling water refrigerant at 25° C., a condensed stream was discharged, and an uncondensed gaseous stream was supplied to the second condenser 310.

The second condenser 310 condensed the gaseous stream of the first condenser 300 using a brine refrigerant at 2° C., the condensed stream was discharged, and the uncondensed gaseous stream was supplied to a vacuum unit 400.

At this time, (1) the nitrogen content (ppm) in the reaction product, (2) the nitrogen removal rate (%) in the separation device 100, (3) the nitrogen content (ppm) in the gaseous stream of the first condenser 300, (4) the flow rate (kg/hr) of the unreacted monomer and the solvent supplied to the vacuum unit 400, and (5) the temperature of the brine refrigerant used in the second condenser 310 were measured and are shown in the following Table 1.

Example 2

The process was performed in the same manner as in Example 1, except that the operation temperature was controlled to 150° C. and the operation pressure was controlled to 2 kgf/cm²g in the separation device 100.

At this time, (1) the nitrogen content (ppm) in the reaction product, (2) the nitrogen removal rate (%) in the separation device 100, (3) the nitrogen content (ppm) in the gaseous stream of the first condenser 300, (4) the flow rate (kg/hr) of the unreacted monomer and the solvent supplied to the vacuum unit 400, and (5) the temperature of the brine refrigerant used in the second condenser 310 were measured and are shown in the following Table 1.

Example 3

The process was performed in the same manner as in Example 1, except that the operation temperature was controlled to 140° C. and the operation pressure was controlled to 4 kgf/cm²g in the separation device 100.

At this time, (1) the nitrogen content (ppm) in the reaction product, (2) the nitrogen removal rate (%) in the separation device 100, (3) the nitrogen content (ppm) in the gaseous stream of the first condenser 300, (4) the flow rate (kg/hr) of the unreacted monomer and the solvent supplied to the vacuum unit 400, and (5) the temperature of the brine refrigerant used in the second condenser 310 were measured and are shown in the following Table 1.

Example 4

The process was performed in the same manner as in Example 1, except that the operation temperature was controlled to 125° C. and the operation pressure was controlled to 2 kgf/cm²g in of the separation device 100. At this time, (1) the nitrogen content (ppm) in the reaction product, (2) the nitrogen removal rate (%) in the separation device 100, (3) the nitrogen content (ppm) in the gaseous stream of the At this time, (1) the nitrogen content (ppm) in the reaction product, (2) the nitrogen removal rate (%) in the separation device 100, (3) the nitrogen content (ppm) in the gaseous stream of the first condenser 300, (4) the flow rate (kg/hr) of the unreacted monomer and the solvent supplied to the vacuum unit 400, and (5) the temperature of the brine refrigerant used in the second condenser 310 were measured and are shown in the following Table 1.

COMPARATIVE EXAMPLE

Comparative Example 1

As shown in FIG. 2, a polymer, an unreacted monomer, and a solvent were separated from a reaction product and recovered.

Specifically, a reaction product including a styrene-acrylonitrile (SAN) copolymer as a polymer, an unreacted monomer, a solvent, and nitrogen was supplied to a volatilization device 200, the polymer was separated from a lower portion, and the unreacted monomer, the solvent, and the nitrogen were separated from an upper discharge stream.

The upper discharge stream from the volatilization device 200 was supplied to the first condenser 300, the upper discharge stream from the volatilization device 200 was condensed using a cooling water refrigerant at 25° C. in the first condenser 300, and an uncondensed gaseous stream was supplied to the second condenser 310.

The second condenser 310 condensed the gaseous stream of the first condenser 300 by supplying a brine refrigerant at 2° C., the condensed stream was discharged, and the uncondensed gaseous stream was supplied to a vacuum unit 400.

At this time, (1) the nitrogen content (ppm) in the reaction product, (2) the nitrogen removal rate (%) in the separation device 100, (3) the nitrogen content (ppm) in the gaseous stream of the first condenser 300, (4) the flow rate (kg/hr) of the unreacted monomer and the solvent supplied to the vacuum unit 400, and (5) the temperature of the brine refrigerant used in the second condenser 310 were measured and are shown in the following Table 1.

TABLE 1

|     | Example 1 | Example 2 | Example 3 | Example 4 | Example 5 | Comparative Example 1 |
|-----|-----------|-----------|-----------|-----------|-----------|-----------------------|
| (1) | 500       | 500       | 500       | 500       | 500       | 500                   |
| (2) | 85.5      | 96.7      | 48.4      | 66.7      | 85.5      | 0                     |
| (3) | 505.4     | 116.6     | 1780.6    | 1152.5    | 565.3     | 3416.6                |
| (4) | 4.8       | 1.1       | 16.8      | 10.9      | 31.2      | 32.1                  |
| (5) | 2         | 2         | 2         | 2         | 7.2       | 2                     | first condenser 300, (4) the flow rate (kg/hr) of the unreacted monomer and the solvent supplied to the vacuum unit 400, and (5) the temperature of the brine refrigerant used in the second condenser 310 were measured and are shown in the following Table 1.

Example 5

The process was performed in the same manner as in Example 1, except that the temperature of the brine refrigerant used in the second condenser 310 was controlled to 7.2° C.

Referring to Table 1, in Examples 1 to 4 in which the separation device 100 was operated with different operation temperatures and operation pressure conditions under the same conditions, it was confirmed that Examples 1 and 2 in which the operation temperature was controlled to 130° C. to 150° C. and the operation pressure was controlled to 1.5 kgf/cm²g to 3.5 kgf/cm²g in the separation device 100, had the best nitrogen removal rate in the separation device 100 and the lowest flow rate of the unreacted monomer and the solvent supplied to the vacuum unit 400.

In this regard, in Comparative Example 1 in which the separation device 100 was not introduced and the reactor discharge stream was directly supplied to the volatilization device 200 as compared with Example 1, it was confirmed that when a refrigerant at the same temperature was used, the flow rates of the unreacted monomer and the solvent supplied to the vacuum unit 400 were increased, and thus, it was found that in Comparative Example 1, the condensation efficiency was decreased due to a nitrogen content increase in the stream introduced to the condenser.

In addition, in Example 5 in which the process was performed in the same manner as in Example 1, but the flow rates of the unreacted monomer and the solvent supplied to the vacuum unit 400 were maintained at a level similar to Comparative Example 1, the temperature of the refrigerant was able to be raised to 7.2° C., and thus, it was found that the utility costs may be reduced.

The invention claimed is:

1. A method of preparing a polymer, the method comprising:

supplying a monomer stream and a solvent stream to a reactor and performing a polymerization reaction to prepare reaction product;

supplying a reactor discharge stream to a separation device, separating a gaseous stream including an inert gas in the separation device, and supplying a liquid stream including the reaction product from which the inert gas is removed to a volatilization device;

separating a polymer from a lower discharge stream from the volatilization device and supplying an upper discharge stream including an unreacted monomer, a solvent, and an inert gas to a condensation unit; and condensing and separating the unreacted monomer and the solvent in the condensation unit and supplying a gaseous stream to a vacuum unit, wherein a content of the inert gas in the gaseous stream discharged from the separation device is 80 wt % or more, wherein a content of the inert gas removed as the gaseous stream in the separation device is 75% to 99% relative to a content of the inert gas included in the reactor discharge stream supplied to the separation device, wherein a content of the inert gas in a liquid stream discharged from the separation device is 10 ppm to 150 ppm, wherein the separation device has an operation temperature of 130° C. to 150° C. and an operation pressure of 1.5 kgf/cm²g to 3.5 kgf/cm²g, wherein a content of the inert gas in a gaseous stream output from the condensation unit is from 100 ppm to 600 ppm, and wherein the inert gas is nitrogen.

2. The method of preparing a polymer of claim 1, wherein the condensation unit includes two or more condensers.

3. The method of preparing a polymer of claim 2, wherein the upper discharge stream from the volatilization device is supplied to a first condenser and the unreacted monomer and the solvent are condensed and separated in the first condenser, and the gaseous stream from the first condenser is supplied to a second condenser, and the unreacted monomer and the solvent are condensed and separated in the second condenser and the gaseous stream from the second condenser is supplied to the vacuum unit.

4. The method of preparing a polymer of claim 1, wherein an operation pressure of the volatilization device is 5 torr to 70 torr.

5. The method of preparing a polymer of claim 1, wherein the polymer includes an aromatic vinyl-unsaturated nitrile-based copolymer.

* * * * *